Patented Aug. 26, 1941

2,253,730

UNITED STATES PATENT OFFICE 2,253,730

PROCESS OF MOLDING CONCRETE

Jean Charles Séailles, Paris, France

No Drawing. Application April 3, 1939, Serial No. 265,827. In France November 3, 1927

1 Claim. (Cl. 25—155)

This invention relates to the molding of concrete into forms of all sizes, even up to pieces of considerable weight and length, and of complicated shapes.

This application is a continuation in part of my copending application Serial Number 691,241, filed Sept. 27, 1933 for Process of molding concrete, which itself is a continuation-in-part, of my application, Serial Number 301,097, filed August 21, 1928 for Process for molding articles from plastic hydraulic mixtures and which has priority from the following foreign applications:

In France, applications filed Nov. 3, 1927 and Feb. 16, 1928, and June 30, 1928:

In Germany, application filed March 17, 1928: In Great Britain, application filed May 2, 1928.

The priority of the foreign filing dates of said application 301,097 is claimed for all matter herein which is common to that application.

The priority of my said application 691,241 is also claimed for all matter herein which is common to that application.

The principal object of this invention is a process of molding articles of concrete in a rapid and efficient way, with a minimum outlay for molds and at a minimum expense for labor.

The invention accordingly comprises the several steps, and the relation of one or more of said steps with relation to each of the others, which are exemplified in the following detailed disclosure, and the scope of the invention will be indicated in the claims.

As is well understood amongst those skilled in the art, concrete consists of a mixture of coarse mineral aggregate, which may be gravel, broken stone, burned earthenware fragments, cinders or other like material, and fine aggregate, of finely comminuted materials of the same kinds, most often of sand, in amount sufficient to fill the voids between the coarse aggregate, and cement in amount sufficient to fill the voids between the coarse and fine aggregates when they are thoroughly mixed together.

When this mixture is wet with water it becomes concrete mortar.

The proportions of ingredients of concrete mixtures may vary rather widely from those given above, but those are of standard mortars. Only sand and cement may be used.

Concrete mortars vary widely in the proportion of water they contain. This varies from a little more water than is necessary to wet the aggregates and to chemically combine with the cement, to such a large amount that the mortar runs freely;

Mortars which have so little water that they will not assume a level surface when piled and permitted to stand are known as dry mixtures, colloquially as "dry mixes," and those which quickly assume a level surface by themselves or by shaking as "wet mixes."

Concrete mortars are given desired forms by being "cast" in molds. The dry mixes are placed in molds, spread out and thoroughly tamped until the particles are forced together into a compact rigid mass, filling the molds.

Such masses and the molds can be separated at once, either by pushing out the concrete or by dismounting the molds. Building blocks of concrete are usually pushed out of the molds, but in the manufacture of larger articles the molds are dismounted.

The wet mix mortars, when filled into molds, flow to all parts thereof, either by themselves or by shaking the mold, and cannot be compacted by tamping. Articles made from such are usually allowed to remain in the molds until they attain sufficient rigidity to permit removal from the molds. This requires a period of several hours, during which the molds cannot be used for other articles.

My invention deals with wet mix concretes.

Workers in concrete know that both dry and wet mixes undergo, a short time after their manipulation ceases, a "set" called a preliminary set and that this slowly passes into a permanent set or hardening.

In the preliminary set the concrete is rigid, but if it is disturbed or the set broken by further manipulation the set will return for a very few disturbances, but each time it will require less force to break the set and the concrete will finally lose its power to set.

A great deal of research into the nature of the setting of cement mortars has been made, and many theories have been advanced to explain it.

A very complete discussion of these theories is found in Rock Products, volume 31, and the most probable theory seems to be that a concrete mortar especially a wet mix is a colloidal dispersion. When this is permitted to remain at rest chemical changes occur which result in the formation of minute elongated crystals, which, by interlacing give the preliminary set to the concrete.

If this set is broken this interlacing is destroyed, but when again permitted to rest fresh crystals are formed, and the set is rebuilt.

As time passes these crystals are replaced or become larger ones which cause the final set or hardness of the mortar.

Consequently a wet mix placed in a mold and left to itself first undergoes, after a not inconsiderable time, the preliminary set, which, at a certain stage is rigid enough to permit the removal of the mold, and then gradually hardens.

Now I have discovered that a concrete mortar of the wet mix type, if vigorously agitated as by vibrations, assumes liquid properties, and, when the agitation ceases, changes to a solid, which upon renewed agitation again becomes a liquid and changes again to a solid upon cessation of the vibration.

This alternation of solid and liquid conditions can occur repeatedly until the formation of the fine crystals of the preliminary set begins to make its influence felt, or until the mortar becomes too stiff to fluidify.

This property of fluidity under vibration and solidity at rest is known as thixotropy and is common to all colloidal dispersions of sufficient concentration. It is defined for colloidal dispersions generally in Colloid Symposium Annual, volume 8, page 354 (1930), but was known long before. I utilize this property in my process of casting concrete, and I verily believe I am the first to do so.

I prepare a mix which is sufficiently wet to provide the necessary fluidity for filling of the mold, that is, so it will flow to all parts of it, either by itself or under the vibrating treatment. The molds must be substantially fluidtight at the sides and bottom so that water cannot escape there, but any excess water will be forced to escape at the open top.

This mold is either mounted upon a vibratable platform, or is provided with means for striking the sides to produce vibrations of the mortar, or a vibrating device may be placed inside the mold. I establish vibrations in either of these ways, or in any effective way, during which vibration the mortar fluidifies and flows freely to all parts of the mold, even if that is very complex. A stick can be plunged into the mortar and freely moved around so long as the vibration continues.

As soon as the vibration ceases, the mortar changes to a solid condition and the stick can no longer be freely moved.

Upon renewal of the vibration, the mortar again liquefies and again becomes solid when the vibration ceases.

I continue the vibration until on its cessation, which may be tentative or experimental to ascertain whether the vibration has continued for a sufficient length of time, the mortar assumes the plastic gelatinous state.

While I have described the state of the mortar as a solid when the vibration ceases, that is not an accurate description of its condition. It rather assumes a plastic gelatinous state.

It will no longer flow, but it can be deformed as by a solid body pressing upon it and when the pressure, even that of a finger, is removed, the deformation disappears owing to its elasticity.

If a rod be inserted in it, when the rod is withdrawn the aperture closes up, either by itself or under slight vibration. This condition or state is known to workmen but it has not heretofore been recognized for what it is—a state depending upon a quality of colloidal dispersions and common to all such. Nor has ever been employed as in my process.

It has not before been differentiated from the preliminary set, which gradually appears as the crystals form.

After this state appears, I immediately transport the mold to a level surface, invert it, upon said surface, and lift it away from the concrete. If the mold has a length of a few feet, and is lifted first at one end, the cast object will drop from the mold at that end, and will progressively sink to the surface as the end is lifted higher, thus forming a curve which travels from one end to the other owing to the elasticity of the object.

If the interior surface of the mold is slightly rough or even has small projections on it, the concrete in this plastic gelatinous state is so elastic that it will deform enough to pass these projections and will reassume its shape when free from the mold.

The final shape, however, shows no trace of the curve and the dimensions are the same as it had when in the mold. The object slides out of the mold without any break or crack in its surface or any permanent deformation.

If, by chance, however, a break occurs, it can be immediately repaired with a trowel, leaving no permanent mark.

It is not necessary that the mold shall be filled before the vibration is set up. Vibration may be initiated at once on beginning to fill the mold, and continued until it is completely filled. In this case it is filled to overflowing, and thus the useless water removed without any scraping of water from its surface.

The proportions of materials used will vary with the size of their particles, their quality, and the objects to be cast. Broken stone may be substituted for gravel, as is well known to cement workers, and the gravel and broken stone used in small sizes, or even completely replaced by sand.

Also, as cement workers will understand, the amount of water used will vary with the quality and characteristics of the other constituents, and with the fluidity desired, the size and shape of the articles to be made, and the flow sections used for the material so that the molds can be rapidly and readily filled under the influence of the vibrations.

Vibrations may be impressed upon the concrete mixture while in the mold by any of the means well known in the arts, such as vibrators, electric or pneumatic hammers striking upon the outside of the mold, or by shaking tables, or even by vibrating bodies inserted in the concrete mixture itself.

The number of vibrations impressed must be sufficient to make the concrete fluid and I have used, in commercial work, as few as sixty vibrations per minute, but I prefer to use a frequency of over a thousand per minute, say fifteen hundred. It is advantageous to use a still larger number, up to more than three thousand per minute. The only limit to the number of vibrations to be produced in the material being that imposed by the possibility of producing them economically and efficiently.

The length of time the vibration is applied necessarily varies with the shape and weight of the article being cast.

In mixing the concrete, the quantity of water to be used is, as is known, also dependent upon the physical nature of the aggregate and the quantity of cement used. The proper quantity to be used in any given instance can best be determined by trial.

With the materials obtainable around Paris, France, the following quantities of materials per cubic meter of concrete are used:

| Cement | Sand | Gravel | Water |
|---|---|---|---|
| *Kilograms* | *Liters* | *Liters* | *Liters* |
| 200 | 400 | 800 | 120/125 |
| 300 | 400 | 800 | 125/130 |
| 400 | 400 | 800 | 130/135 |

These amounts can be varied according to the form of the article to be made, since the degree of fluidification necessary depends somewhat upon this.

The practical rule is that the concrete should contain enough water so that:

(1) It will fluidify in the mold when vibrated without difficulty, (2) It will be in an elastic and gelatinous plastic state after the vibrations cease, which will permit any deformation necessary to its removal from the mold without cracking or breaking of the article.

If the article manufactured is to contain reinforcements, the mold can be filled to the level at which these are to be used, the mold filled and the vibration set up, or, and this is preferable, the mold may be filled up to the level of the reinforcements, the material fluidified by vibration, the reinforcing elements placed in their proper position, and filling of the mold completed. Vibrations may be begun at the start, or not until the material has reached the level of the reinforcements, and either continued immediately after the reinforcing elements have been placed while the remaining portion of the mold is being filled, or not until the filling is complete.

The vibration must end before the crystals characteristic of the preliminary set appear and before the mortar becomes a rigid, inelastic mass. As the vibrations proceed the excess water rises to the surface and may be permitted to run off, or be absorbed by dry cement.

In further elucidation of my invention but in no sense as a limitation thereto, I give the following example of the manufacture of sheet piling, 8 meters long, and 80 centimeters wide.

The mixture used was cement, 350; sand, 250; gravel, 1000; water, 115, all by volume. This mixture was made up, placed in the mold and vibrated at the rate of 1500 vibrations per minute for ten minutes, at the beginning of this manufacture, of this article, but the vibration was later shortened to only two minutes, when experience had been gained.

The average total time occupied by the manufacture of a piling of this size was thirty minutes, and the pieces weighed about 2500 kilograms each.

The manipulations included in the elapsed time of thirty minutes, as well as in all the times mentioned below, were:

Putting in place the reinforcements;
Filling the mold with concrete;
Vibration;
Transporting the mold after the vibration to the place where the article was removed from it.
Removing and drying the mold.
Returning the mold to the casting place.

As further examples, the elapsed time and length of vibration for a few other articles given below:

Pillars for electric light lines which weighed 800 kilograms each, with one mold, 15 minutes time elapsed, vibration 50 seconds, rate, 1500 per minute.

Wallpanels, 4 to 5 minutes elapsed time, vibration 20 to 30 seconds, rate 1500 per minute.

Simpler and lighter pieces, 2 or 3 minutes, elapsed time, vibration 20 to 30 seconds, rate, 1500 per minute.

With slower vibration rate, the time would be lengthened, with a more rapid one, shortened.

The time of vibration varies in general from several seconds to several minutes, but after some practice I have never exceeded five or six minutes. However, it is possible that pieces very hard to make, very voluminous or very complicated) might require up to fifteen or twenty minutes vibration.

The composition of concrete given above is the one used for ordinary articles, but it is possible that for very narrow pieces one would use a finer stone or gravel, or even sand without gravel, (for example for walls), in which case the process is still applicable.

The mold may be removed immediately after cessation of the vibration, the time which elapses being only that necessary to carry it to the place where it is to be emptied. In practise, this time may vary from several seconds for the light pieces, which are removed from the mold beside the vibrating machine, to 25 or 30 minutes for the heavy pieces, which must be transported some distance from the vibrator.

I am aware of a number of U. S. patents which vibrate molds containing cement mortar or the mortar itself, which were cited as references in the examination of the parent applications listed above.

Most of these patents are for machines for making concrete building blocks, and, as those skilled in making such blocks know, a dry mix is most frequently used, and even if a wet mix is used the vibrations so thoroughly compact the mortar that the blocks must usually be pushed out of the molds. Others of these patents disclose processes and apparatus for vibrating the mortar within molds, to the state of thorough compaction, as for instance in reinforced vertical columns or horizontal beams but the molds are necessarily left in place until the hardening of the concrete is well advanced or complete. In other patents great masses of wet mix mortar are vibrated to produce thorough settling and compaction but the molds are also left in place until setting occurs.

It is not denied that when wet mix mortars are vibrated the concrete fluidifies and that when the vibration ceases, it assumes the solid or plastic gelatinous state described above. The production of that state is not my invention.

It has usually been assumed to be a set and the distinction drawn above has not been recognized. In the plastic gelatinous state the concrete is a mass of colloidal material with a rigidity dependent upon the closeness of the solid particles. Renewed vibrations will separate these particles and cause the mass to become liquid.

In a set, the cement in this colloidal mass has formed small, elongated crystals, which are interlaced giving rigidity or set to the mass, and as these crystals grow or are replaced by larger ones the hardening of the concrete occurs.

My invention consists in this, that the plastic gelatinous state is induced by vibration and that when it occurs, upon cessation of the vibration, the object is immediately separated from the mold in the manner described.

I am aware of the Patent 1,574,565 of Ferguson, which discloses addition of water "to the cementitious mixture in sufficient quantity to provide a highly saturated or quaky wet mass, whereby there is secured a more consolidated or solidified impervious block."

Molds are filled with this mass and vibrated or "jigged." These molds are held in a container which can be inverted as well as "jigged." The jigging commences as soon as the mass begins to enter the molds and is continued until the quaky contents "become more and more consolidated therein as the excess water and air bubbles are caused to escape."

The mold support and molds are then inverted and subjected to:

"a further jerky motion * * * which will obviously insure a thorough consolidation of the contents thereof."

This second "jigging"

"is of considerable importance inasmuch as it loosens the ends of the webs of the blocks * * * as without this final jiggling there might be a decided tendency towards the ends of the webs sticking to and being held in the mold forms."

Ferguson discloses that with previous machines for molding concrete building blocks "there has arisen the serious objection that there is found in the quaky wet mixture larger -or smaller interstices caused by improper setting and air bubbles which * * * result in blocks that are very porous, absorptive and otherwise defectively weak."

He therefore adds more water and "jiggles" the mortar until

"there is assured a more consolidated or solidified impervious block."

In other words Ferguson vibrates his wet mix until it becomes a solid block, which may stick to the molds. He is able to do this because his molds are not water tight. In either the upright or inverted position water escapes through the joints of the molds. My molds are tight. Water only escapes at the open top.

Ferguson speaks of containers, having molding compartments associated with a jiggling support for settling or consolidating the contents thereof.

It is obvious that Ferguson might operate his machine until the mortar becomes fluid, then stop it, allow the plastic gelatinous state to occur and immediately remove the molds, but his description refers to "a more consolidated or solidified impervious block." Those words do not describe a flexible elastic mortar in which a depression made by pressure immediately disappears when the pressure is removed.

I am also aware of a patent to Scott, Number 2,106,329, Jan. 25, 1938. The application was filed May 25, 1927. This is an apparatus patent in which the molds are filled with concrete which may be either "semi-liquid, plastic and semi-plastic or damp."

His apparatus has peculiar advantages

"both when applied to a mix of wet consistency and to mix of dry or damp consistency."

He obtains this advantage because his mold is not water tight, it is water eliminating. It is composed of a separate bottom able to move freely between the lateral sides so as to eject the finished product. When vibrating the concrete rapidly and vigorously, any excess of water is filtered away and as the mold is not watertight this water is eliminated and Scott obtains the same final result however large or small the quantity of water in his starting material.

Since certain changes in carrying out the above processes and certain modifications in the articles which embody the invention may be made without departing from the scope thereof, it is intended that all matter contained in the above description shall be interpreted as illustrative and not as limiting.

I claim:

The process of manufacturing concrete articles which comprises preparing a concrete mixture containing sufficient water to flow readily when vibrated, introducing this mixture into an open-topped, water-tight mold, rapidly vibrating it on a vibrating platform at such a rate that it will liquefy and flow to all parts of the mold and until, upon cessation of the vibrations, the mixture will assume a plastic, gelatinous state, then removing said mold from the vibrating platform, inverting said mold on a base while the mixture is still in said gelatinous state and before any setting takes place, raising one end of the mold slightly from the base and causing the gelatinous mass of concrete to slide out of the mold progressively starting at the raised end and with consequent unavoidable deformation, whereupon the elasticity of said gelatinous mass causes it to resume its molded shape upon said base without deformation.

JEAN CHARLES SÉAILLES.